(12) United States Patent
Moh et al.

(10) Patent No.: US 9,547,207 B2
(45) Date of Patent: Jan. 17, 2017

(54) DISPLAY APPARATUS

(71) Applicant: Samsung Display Co., Ltd., Yongin (KR)

(72) Inventors: Sangmoon Moh, Hwaseong-si (KR); MyeongSu Kim, Hwaseong-si (KR); Jinho Park, Suwon-si (KR); Kideog Song, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 175 days.

(21) Appl. No.: 14/498,656

(22) Filed: Sep. 26, 2014

(65) Prior Publication Data

US 2015/0219947 A1  Aug. 6, 2015

(30) Foreign Application Priority Data

Feb. 4, 2014  (KR) .......................... 10-2014-0012708

(51) Int. Cl.
*G02F 1/133* (2006.01)
*G02F 1/1345* (2006.01)

(52) U.S. Cl.
CPC ....... *G02F 1/13452* (2013.01); *G02F 1/13454* (2013.01)

(58) Field of Classification Search
CPC combination set(s) only.
See application file for complete search history.

(56) References Cited

U.S. PATENT DOCUMENTS

| | | | |
|---|---|---|---|
| 7,777,854 B2 | 8/2010 | Moon | |
| 8,351,009 B2 | 1/2013 | Wakita et al. | |
| 8,450,753 B2 * | 5/2013 | Shiota | G02F 1/13452 257/678 |
| 2011/0169792 A1 | 7/2011 | Shimizu et al. | |

FOREIGN PATENT DOCUMENTS

| | | |
|---|---|---|
| JP | 2007-052146 | 3/2007 |
| JP | 4177222 | 11/2008 |
| KR | 100223156 | 10/1999 |
| KR | 10-2005-0012520 | 2/2005 |
| KR | 10-2007-0027891 | 3/2007 |
| KR | 10-2010-0066237 | 6/2010 |
| KR | 101146526 | 5/2012 |
| KR | 10-2012-0075096 | 7/2012 |

* cited by examiner

*Primary Examiner* — Van Chow
(74) *Attorney, Agent, or Firm* — H.C. Park & Associates, PLC

(57) ABSTRACT

A display apparatus including a display panel. The display panel includes a pixel generating an image, and a driver chip disposed on the display panel to drive the display panel. The driver chip includes a driving IC, signal bumps, an input bump, and an output bump electrically connected to the input bump. The display panel further includes a printed circuit board including a timing controller, a flexible printed circuit board electrically connecting the display panel and the printed circuit board, signal lines each having one end electrically connected to one of the signal bumps and the other end electrically connected to the timing controller, an input line applying a test signal to the input bump, an output line of which one end thereof is electrically connected to the output bump, and a test resistor connected to the output line.

20 Claims, 7 Drawing Sheets

DISPLAY APPARATUS

CROSS-REFERENCE TO RELATED APPLICATION

This application claims priority from and the benefit of Korean Patent Application No. 10-2014-0012708, filed on Feb. 4, 2014, which is hereby incorporated by reference for all purposes as if fully set forth herein.

BACKGROUND

Field

Exemplary embodiments of the present invention relate to a display apparatus having a driver chip mounted by a chip-on-glass (COG) scheme.

Discussion of the Background

Various electronic devices, such as a smart phone, a digital camera, a notebook computer, a navigation system, a television set, etc., include a display apparatus to display an image.

The display apparatus includes a pixel to generate the image, a driver to drive the pixel, and a timing controller to control the driver. The display apparatus includes signal lines to electrically connect the driver and the timing controller. The timing controller applies a control signal to the driver to control the driver through the signal lines.

The above information disclosed in this Background section is only for enhancement of understanding of the background of the invention and, therefore, it may contain information that does not constitute prior art.

SUMMARY

Exemplary embodiments of the present invention provide a display apparatus capable of accurately measuring a transmission characteristic of a data control signal applied to a data driver thereof.

Additional features of the invention will be set forth in the description which follows, and in part will become apparent from the description, or may be learned from practice of the invention.

An exemplary embodiment of the present invention discloses a display apparatus including a display panel that includes a pixel generating an image, a driver chip disposed on the display panel and configured to drive the display panel and including a driving IC, signal bumps, an input bump, and an output bump electrically connected to the input bump, a printed circuit board that includes a timing controller, a flexible printed circuit board that electrically connects the display panel and the printed circuit board, signal lines each having one end electrically connected to the signal bumps and the other end electrically connected to the timing controller, an input line that applies a test signal to the input bump, an output line of which one end thereof is electrically connected to the output bump, and a test resistor connected to the output line.

Exemplary embodiments of the present invention also disclose a display apparatus including a display panel that includes a pixel generating an image, a driver chip disposed on the display panel and configured to drive the display panel and including a driving IC, signal bumps, first and second input bumps, and first and second output bumps electrically connected to the first and second input bumps, a printed circuit board that includes a timing controller, a flexible printed circuit board that electrically connects the display panel and the printed circuit board, signal lines each having one end electrically connected to the signal bumps and the other end electrically connected to the timing controller, first and second input lines that respectively apply first and second test signals to the first and second input bumps, first and second output lines of which one ends thereof are electrically connected to the first and second output bumps, respectively, and a test resistor connected between the other ends of the first and second output lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
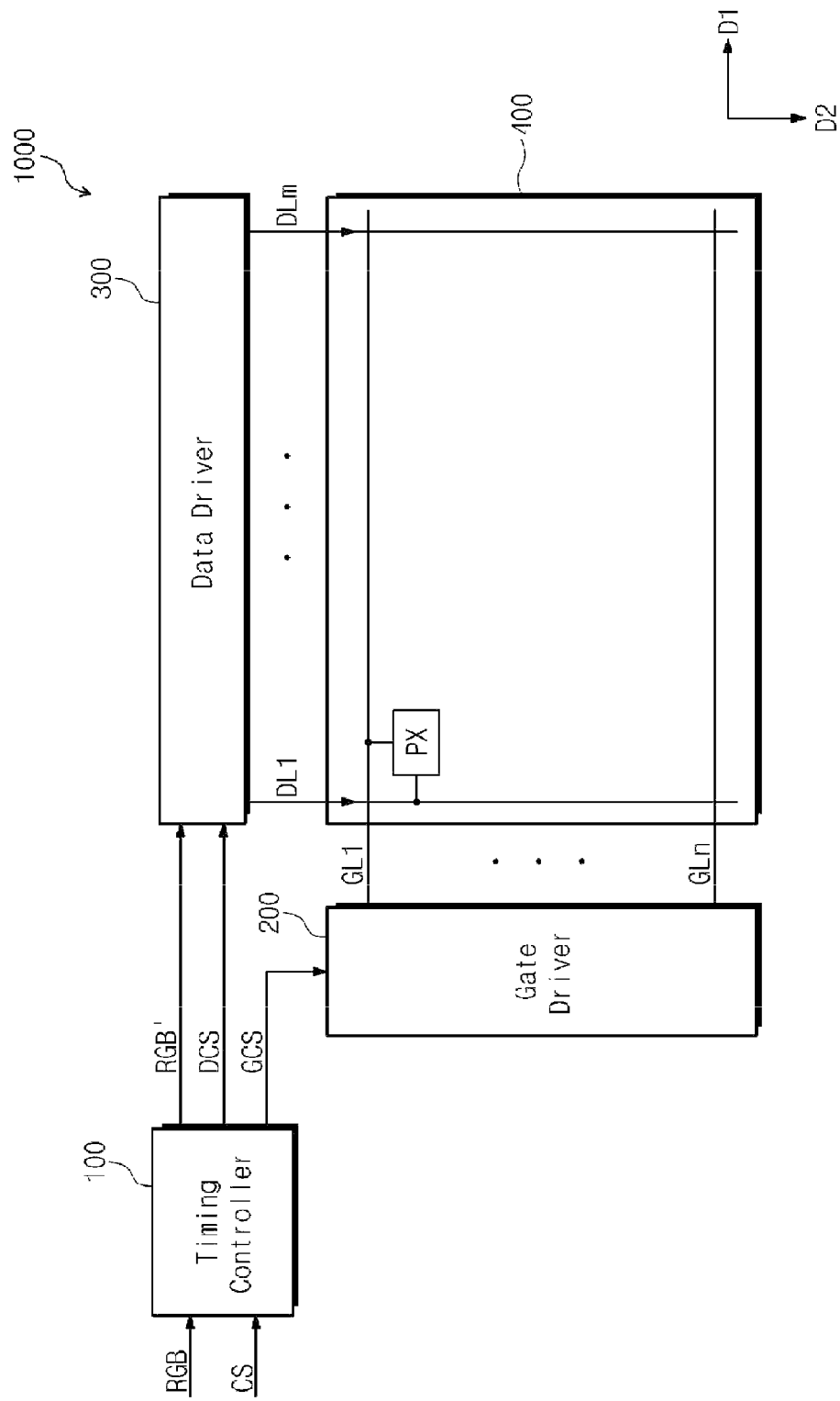
FIG. 1 is a block diagram showing a display apparatus according to an exemplary embodiment of the present invention.

The present invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected to, or coupled to the other element or layer, or intervening elements or layers may be present. In contrast, when an element is referred to as being "directly on," "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram showing a display apparatus 1000 according to an exemplary embodiment of the present disclosure.

Referring to FIG. 1, the display apparatus 1000 includes a display panel 400 to display an image, gate and data drivers 200 and 300 to drive the display panel 400, and a timing controller 100 to control the gate driver 200 and the data driver 300.

The timing controller 100 receives image information RGB and control signals CS from outside of the display apparatus 1000. The timing controller 100 converts a data format of the image information RGB to a data format appropriate to an interface between the timing controller 100 and the data driver 300 to generate image data RGB', and applies the image data RGB' to the data driver 300. The timing controller 100 generates a data control signal DCS, such as an output start signal, a horizontal start signal, etc., and a gate control signal GCS, such as a vertical start signal, a vertical clock signal, a vertical clock bar signal, etc., on the basis of the control signals CS. The data control signal DCS is applied to the data driver 300 and the gate control signal GCS is applied to the gate driver 200.

The gate driver 200 sequentially outputs gate signals in response to the gate control signal GCS provided from the timing controller 100.

The data driver 300 converts the image data RGB' to data voltages in response to the data control signal DCS provided from the timing controller 100. The data voltages are applied to the display panel 400.

The display panel 400 includes gate lines GL1 to GLn, data lines DL1 to DLm, and pixels PX.

The gate lines GL1 to GLn extend in a first direction D1 and are arranged in a second direction D2 substantially normal to the first direction D1 so as to be substantially parallel to each other. The gate lines GL1 to GLn are connected to the gate driver 200 to receive the gate signals from the gate driver 200.

The data lines DL1 to DLm extend in the second direction D2, and are arranged in the first direction D1 to be substantially parallel to each other. The data lines DL1 to DLm are connected to the data driver 300 to receive the data voltages from the data driver 300.

The pixels PX are arranged in a matrix. Each pixel PX includes a thin film transistor and a liquid crystal capacitor, and is connected to a corresponding gate line of the gate lines GL1 to GLn and a corresponding data line of the data lines DL1 to DLm. In more detail, each pixel PX is turned on or off in response to a corresponding gate signal of the gate signals, which is applied thereto. The turned-on pixel PX generates the image corresponding to the data voltage applied thereto.

Various display panels, e.g., an organic light emitting display panel, a liquid crystal display panel, a plasma display panel, an electrophoretic display panel, etc., may be used as the display panel 400.

Figure 2:
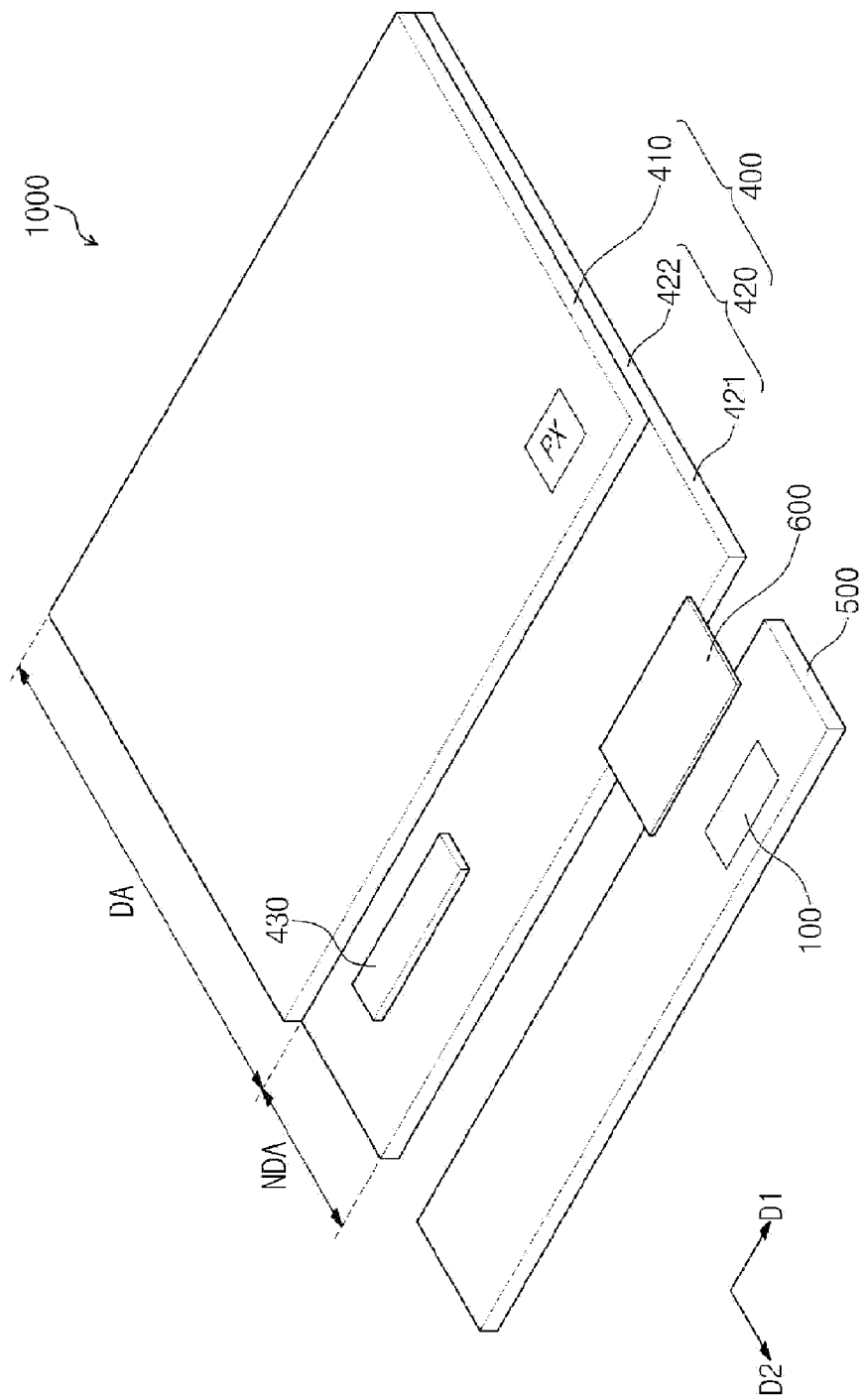
FIG. 2 is a perspective view showing a display apparatus according to an exemplary embodiment of the present invention.

FIG. 2 is a perspective view showing the display apparatus shown in FIG. 1.

Referring to FIG. 2, the display panel 400 includes an array substrate 420 and an opposite substrate 410 facing the array substrate 420. A light control layer (not shown) is interposed between the opposite substrate 410 and the array substrate 420. The light control layer may be an organic light emitting layer, a liquid crystal layer, a plasma layer, or an electrophoretic layer.

The display panel 400 may have various shapes. For instance, the display panel 400 may have a rectangular plate shape with two pairs of sides, each pair having adjacent sides that are equal in length and angles being equal where pairs meet. The display panel 400 includes a display area DA and a non-display area NDA. The pixels PX are arranged in the display area DA, and the image is displayed through the pixels PX. The image is not displayed in the non-display area NDA, and elements used to drive the pixels PX are disposed in the on-display area NDA.

The opposite substrate 410 is disposed to correspond to the display area DA. The array substrate 420 includes a pad part 421 and an array part 422. The array part 422 is disposed in the display area DA, and faces the opposite substrate 410. The thin film transistors are arranged in the array part 422 in a matrix. The pad part 421 is disposed in the non-display area DA. The pad part 421 extends in the second direction D2 and is longer than the opposite substrate 410. An upper surface of the pad part 421 is exposed to the outside without being covered by the opposite substrate 410.

The display apparatus 1000 includes a driver chip 430. The driver chip 430 is mounted on the pad part 421 in a chip-on-glass (COG) scheme. As an example, the data driver 300 (refer to FIG. 1) may include one driver chip 430, but more than one driver chip 430 may be included in the data driver 300.

The display apparatus 1000 further includes a printed circuit board 500 and a flexible printed circuit board 600.

The timing controller 100 is mounted on the printed circuit board 500 and is embodied as a chip.

The flexible printed circuit board 600 electrically connects the printed circuit board 500 and the display panel 400. In detail, one end of the flexible printed circuit board 600 is connected to the printed circuit board 500 and the other end of the flexible printed circuit board 600 is connected to the pad part 421.

Figure 3:
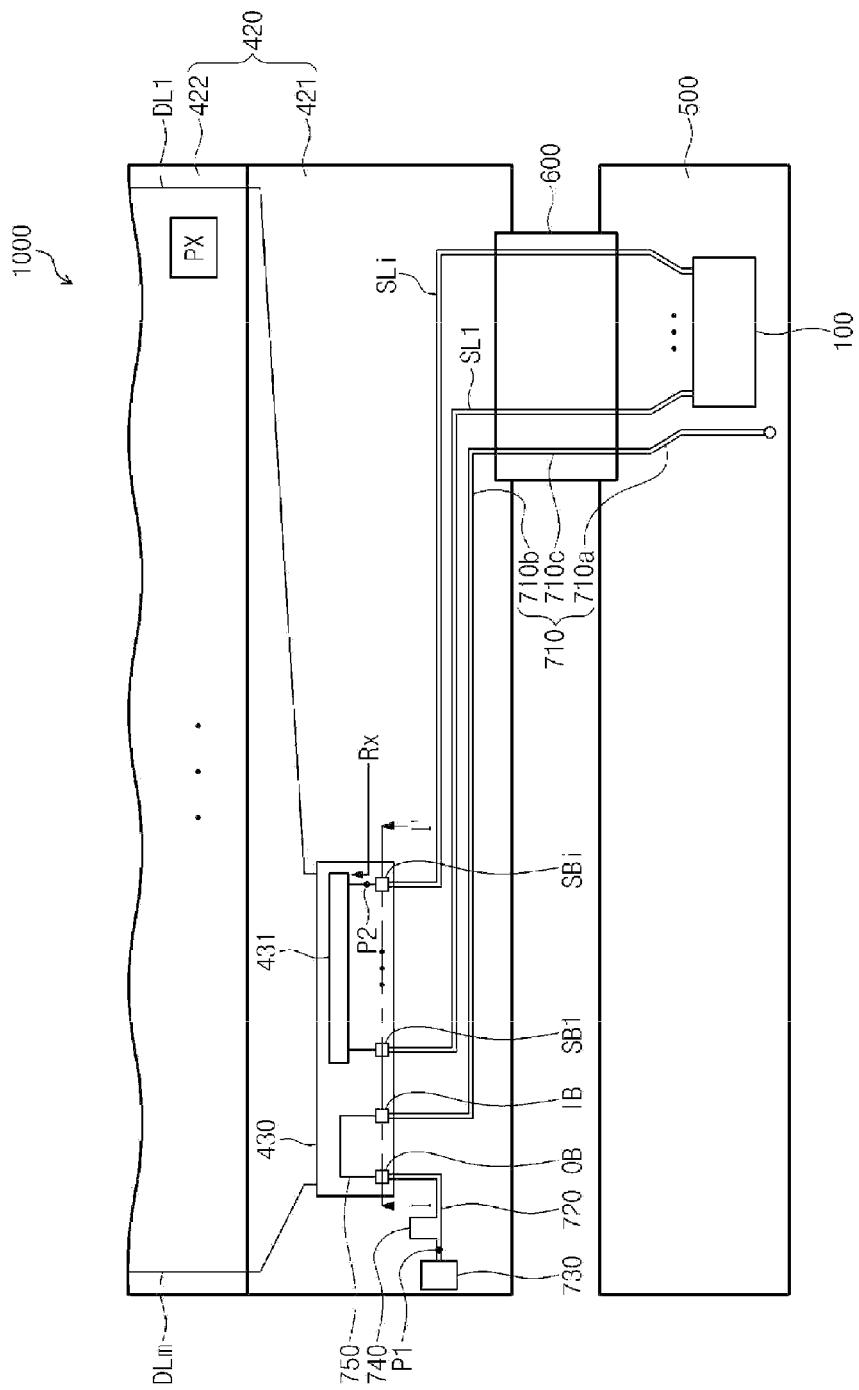
FIG. 3 is a partially enlarged plan view showing a portion of the display apparatus shown in FIG. 2.
Figure 4:
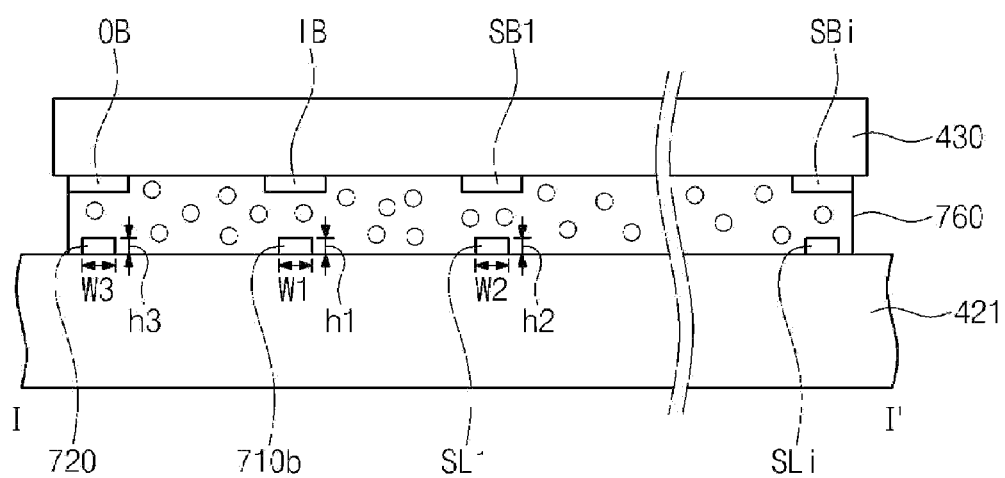
FIG. 4 is a cross-sectional view taken along a line I-I' shown in FIG. 3.

FIG. 3 is a partially enlarged plan view showing a portion of the display apparatus shown in FIG. 2, and FIG. 4 is a cross-sectional view taken along a line I-I' shown in FIG. 3.

Referring to FIGS. 3 and 4, the display apparatus 1000 includes the signal lines SL1 to SLi, an input line 710, an output line 720, and a test resistor 730.

The signal lines SL1 to SLi extend to the pad part 421 through the printed circuit board 500 and the flexible printed circuit board 600. One end of each of the signal lines SL1 to SLi is electrically connected to the driver chip 430, and the other end of each of the signal lines SL1 to SLi is electrically connected to the timing controller 100. The timing controller 100 applies the data control signal DCS (refer to FIG. 1) and the image signals RGB' to the signal lines SL1 to SLi. The driver chip 430 receives the data control signal DCS and the image signals RGB' through the signal lines SL1 to SLi.

The input line 710 is electrically connected to the driver chip 430 through the pad part 421, the flexible printed circuit board 600, and the printed circuit board 500. The input line 710 includes a first sub-input line 710a disposed on the printed circuit board 500, a second sub-input line 710b disposed on the pad part 421, and a third sub-input line 720c disposed on the flexible printed circuit board 600 to electrically connect the first and second sub-input lines 710a and 710b. One end of the second sub-input line 710b is electrically connected to the driver chip 430.

The input line 710 extends substantially parallel to the signal lines SL1 to SLi without crossing any of the signal lines SL1 to SLi.

The output line 720 is disposed on the pad part 421 and does not cross the signal lines SL1 to SLi and the second sub-input line 710b. One end of the output line 720 is electrically connected to the driver chip 430, and the other end of the output line 720 is electrically connected to the test resistor 730.

The driver chip 430 includes an input bump IB, an output bump OB, and signal bumps SB1 to SBi. As an example, the signal bumps SB1 to SBi can be disposed at a side of the driver chip 430 adjacent to the printed circuit board 500. The signal bumps SB1 to SBi is disposed in sequence along the first direction. The signal bumps SB1 to SBi comprises material with electrical conductivity. For example, the signal bumps SB1 to SBi can be composed of a material that is same as a material included in the signal lines SL1 to SLi.

As shown in FIG. 4, the signal bumps SB1 to SBi are disposed on the one end of each of the signal lines SL1 to SLi. An anisotropic conductive film 760 is disposed between the signal bumps SB1 to SBi and the signal lines SL1 to SLi. The signal bumps SB1 to SBi are electrically connected to the one end of each of the signal lines SL1 to SLi by the anisotropic conductive film 760.

The input bump IB is disposed on one end of the second sub-input line 710b. The anisotropic conductive film 760 is disposed between the input bump IB and the second sub-input line 710b, and the input bump IB is electrically connected to the one end of the second sub-input line 710b by the anisotropic conductive film 760.

The output bump OB is disposed on one end of the output line 720. The anisotropic conductive film 760 is disposed between the output bump OB and the output line 720, and the output bump OB is electrically connected to the one end of the output line 720 by the anisotropic conductive film 760.

The input bump IB and the output bump OB are electrically connected to each other. As an example, the driver chip 430 may further include a shorting line 750, as shown in FIG. 3. One end of the shorting line 750 is electrically connected to the input bump IB and the other end of the shorting line 750 is electrically connected to the output bump OB.

The driver chip 430 includes a driving integrated circuit (hereinafter, referred to as a driving IC) 431, as shown in FIG. 3. The driving IC 431 is electrically connected to signal bumps SB1 to SBi. The driving IC 431 receives the data control signal DCS and the image signals RGB' from the signal bumps SB1 to SBi, and generates the data voltages on the basis of the data control signal DCS and the image signals RGB'. The driver chip 430 applies the data voltages to the pixels PX through the data lines DL1 to DLm.

The test resistor 730 has substantially the same resistance value as a termination resistance of the driving IC 431. Hereinafter, a node to which the driving IC 431 and the signal lines SL1 to SLi are connected is referred to as an IC input terminal P2. An input resistance obtained by looking to the driving IC 431 from the IC input terminal P2 corresponds to the termination resistance.

An impedance of the input line 710 is substantially the same as an impedance of each of the signal lines SL1 to SLi. The input line 710 has a first width w1 and a first thickness h1, as shown in FIG. 4. When the signal transferred through the signal lines SL1 to SLi and the input line 710 is a high frequency signal, the width and thickness of the signal lines SLi to SLi and the input line 710 have a significant effect on the impedance. The first width W1 and the first thickness h1 may be adjusted to allow the impedance of the input line 710 to be equal to that of the signal lines SLi to SLi. In the present exemplary embodiment, the first thickness h1 of the input line 710 is substantially the same as a second thickness h2 of the signal lines SLi to SLi, and the first width W1 of the input line 710 is substantially the same as a second width W2 of the signal lines SLi to SLi.

An impedance of the output line 720 is substantially the same as the impedance of each of the signal lines SLi to SLi. The output line 720 has a third width W3 and a third thickness h3. When the signal transferred through the signal lines SLi to SLi and the output line 720 is a high frequency signal, the width and thickness of the signal lines SLi to SLi and the output line 720 have a significant effect on the impedance. The third width W3 and the third thickness h3 may be adjusted to allow the impedance of the output line 720 to be equal to that of the signal lines SLi to SLi. In the present exemplary embodiment, the third thickness h3 of the output line 720 is substantially the same as the second thickness h2 of the signal lines SLi to SLi, and the third width W3 of the output line 720 is substantially the same as the second width W2 of the signal lines SLi to SLi.

The data control signal DCS is applied to the IC input terminal P2 after sequentially passing through the signal lines SLi to SLi and the signal bumps SB1 to SBi. In this case, the data control signal DCS may be distorted by the signal lines SLi to SLi and the signal bumps SB1 to SBi. For instance, the data control signal DCS may be distorted by a reflected wave caused by a variation in impedance of bending portions of the signal lines SLi to SLi, or by a distribution of a contact resistance caused by the signal bumps SB1 to SBi. Because the IC input terminal P2 is disposed inside the driver chip 430, it may not be possible to directly measure the data control signal DCS at the IC input terminal P2.

Hereinafter, a node to which the test resistor 730 and the output line 720 are connected is referred to as a "resistor input terminal P1".

When a test signal is applied to the other end of the input line 710, the test signal is applied to the resistor input terminal P1 after sequentially passing through the input lint 710, the input bump IB, the short line 750, the output bump OB, and the output line 720, which is similar to the data control signal DCS. In this case, the test signal is distorted by the input line 710, the input bump IB, the short line 750, the output bump OB, and the output line 720 before being applied to the resistor input terminal P1. For instance, the test signal is distorted by a reflected wave caused by a variation in impedance of a bending portion of the input line 710, and a distribution of a contact resistance caused by the input bump IB. Then, the distorted test signal is measured at the resistor input terminal P1, and thus, a transmission characteristic of the test signal may be evaluated.

As described above, the resistance value of the test resistor 730 is equal to the termination resistance of the driving IC 431, and the impedance of the input line 710 and the output line 720 is equal to that of the signal lines SL1 to SLi. In addition, the test resistor 730 is electrically connected to the input line 710 through the input bump IB and the output bump OB, and the driving IC 431 is connected to the signal lines SL1 to SLi through the signal bumps SB1 to SBi. As a result, the resistor input terminal P1 may be equivalent to the IC input terminal P2 in view of circuit signal measurements.

Accordingly, the transmission characteristic of the data control signal DCS input to the driving IC 431 may be accurately evaluated by measuring the test signal at the resistor input terminal P1, and evaluating the transmission characteristic of the test signal. Therefore, it is unnecessary to directly measure the IC input terminal P2 of the driving IC.

As described above, when the transmission characteristic of the data control signal DCS is checked, the output characteristic of the data control signal DCS may be easily checked, since it is unnecessary to directly measure the IC input terminal P2 defined in a small area.

In addition, according to the present exemplary embodiment, the transmission characteristics of the data control signal DCS may be evaluated. The transmission characteristics of the data control signal DCS are influenced by the termination resistance of the driving IC 431, the contact resistance of the signal bumps SB1 to SBi, and the impedance of the signal lines SL1 to SLi.

Although not shown in the figures, the flexible printed circuit board 500 is electrically connected to the pad part 410 and the printed circuit board 500 through an anisotropic conductive film (not shown). In this case, since the signal lines SL1 to SLi and the input line 710 pass through the anisotropic conductive film, the transmission characteristics of the data control signal DCS may be measured in consideration of the electrical properties of the anisotropic conductive film.

As an example, the display apparatus 1000 may further include a test pad 740 electrically connected to the output line 720, as shown in FIG. 3. The test pad 740 may have a rectangular shape and a width greater than that of the output line 720. The test pad 740 may be formed by elongating an end of the output line 720. Since the test pad 740 has a width greater than that of the output line 720, the test signal may be more easily evaluated through the test pad 740.

Figure 5:
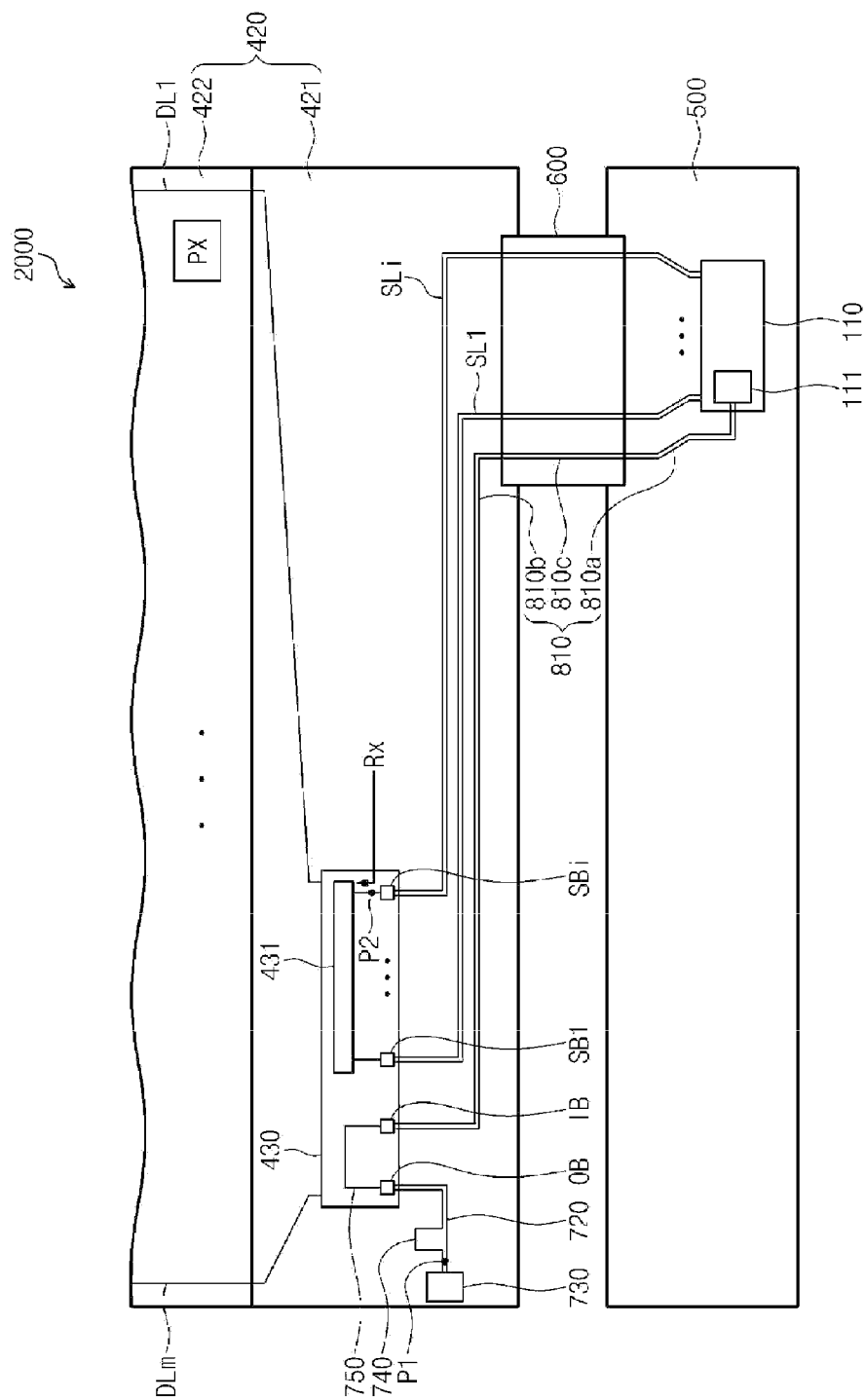
FIG. 5 is a partially enlarged plan view showing a portion of a display apparatus according to another exemplary embodiment of the present invention.

FIG. 5 is a partially enlarged plan view showing a portion of a display apparatus according to another exemplary embodiment.

Referring to FIG. 5, a display apparatus 2000 includes an input line 810 and a timing controller 110. The display apparatus 2000 shown in FIG. 5 has the same structure and function as those of the display apparatus 1000 shown in FIGS. 2 to 4, except for the input line 810 and the timing controller 110.

The timing controller 110 includes a test signal input part 111. The test signal input part 111 applies the test signal to the input line 810.

One end of the input line 810 is electrically connected to the input bump IB, and the other end of the input line 810 is electrically connected to the test signal input part 111. The test signal input part 111 applies the test signal through the other end of the input line 810. Thus, no additional process of applying the test signal to the input line 810 is required. As a result, the test signal may be easily applied to the input line 810.

Figure 6:
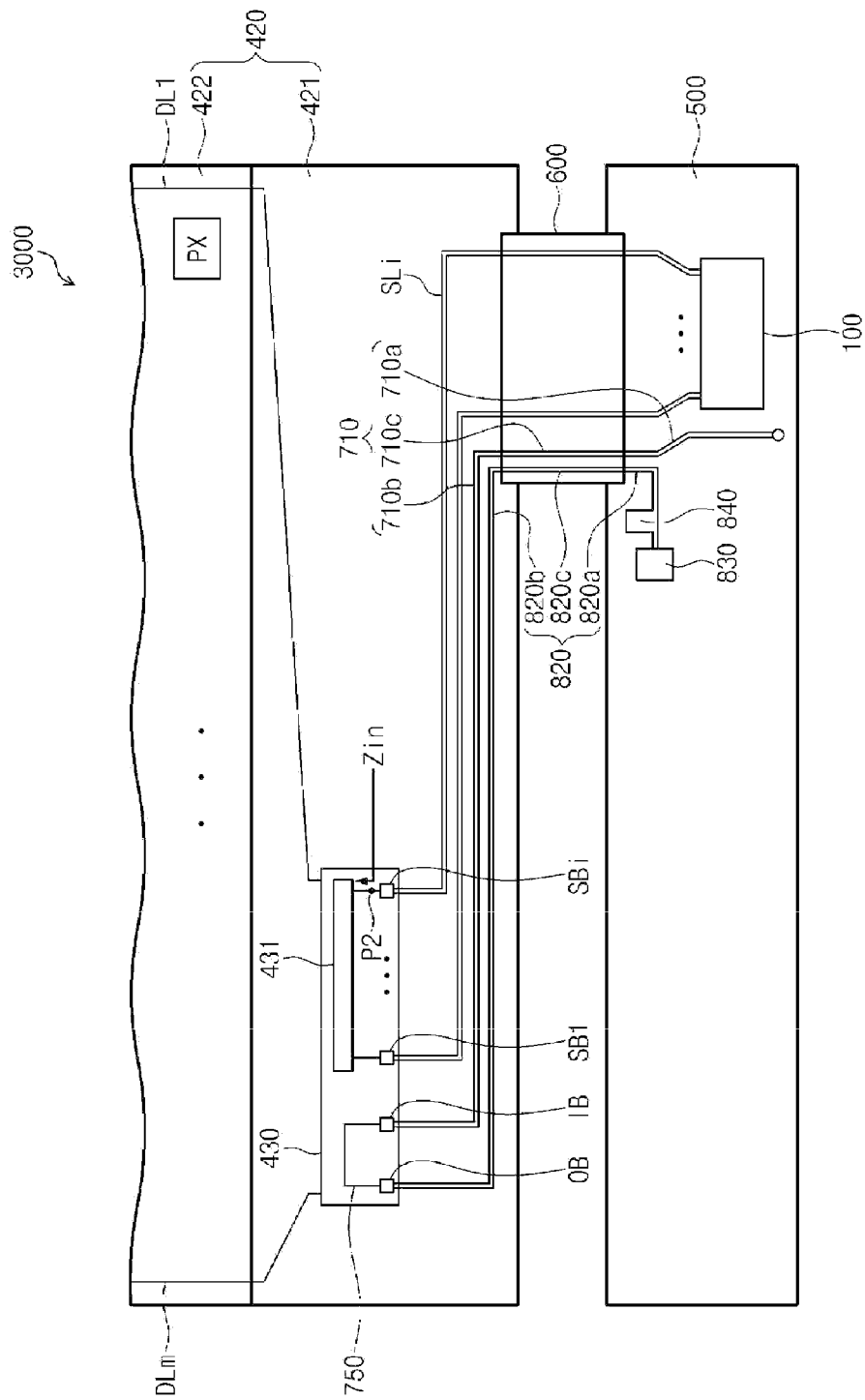
FIG. 6 is a partially enlarged plan view showing a portion of a display apparatus according to another exemplary embodiment of the present invention.

FIG. 6 is a partially enlarged plan view showing a portion of a display apparatus according to another exemplary embodiment of the present disclosure.

Referring to FIG. 6, a display apparatus 3000 includes an output line 820, a test resistor 830, and a test pad 840. The display apparatus 3000 shown in FIG. 6 has the same structure and function as those of the display apparatus 1000 shown in FIGS. 2 to 4, except for the output line 820, the test resistor 830, and the test pad 840.

The test resistor 830 and the test pad 840 are disposed on the printed circuit board 500.

The output line 820 is electrically connected to the driver chip 430 through the pad part 421, the flexible printed circuit board 600, and the printed circuit board 500. The output line 820 includes a first sub-output line 820a disposed on the printed circuit board 500, a second sub-output line 820b disposed on the pad part 421, and a third sub-output line 820c disposed on the flexible printed circuit board 600 to electrically connect the first sub-output line 820a and the second sub-output line 820b. One end of the second sub-output line 820b is electrically connected to the output bump OB, and the other end of the first sub-output line 820a is electrically connected to the test resistor 830.

In the present exemplary embodiment, the test resistor 830 may be, for example, a variable resistor. Accordingly, the transmission characteristic of the test signal may be checked in accordance with a variation in resistance value of the variable resistor, while the resistance value of the variable resistor is varied.

The test pad 840 is electrically connected to the first sub-output line 820a. The test pad 840 has a rectangular shape and is wider the output line 820. The test pad 840 may be formed by elongating an end of the output line 820.

Figure 7:
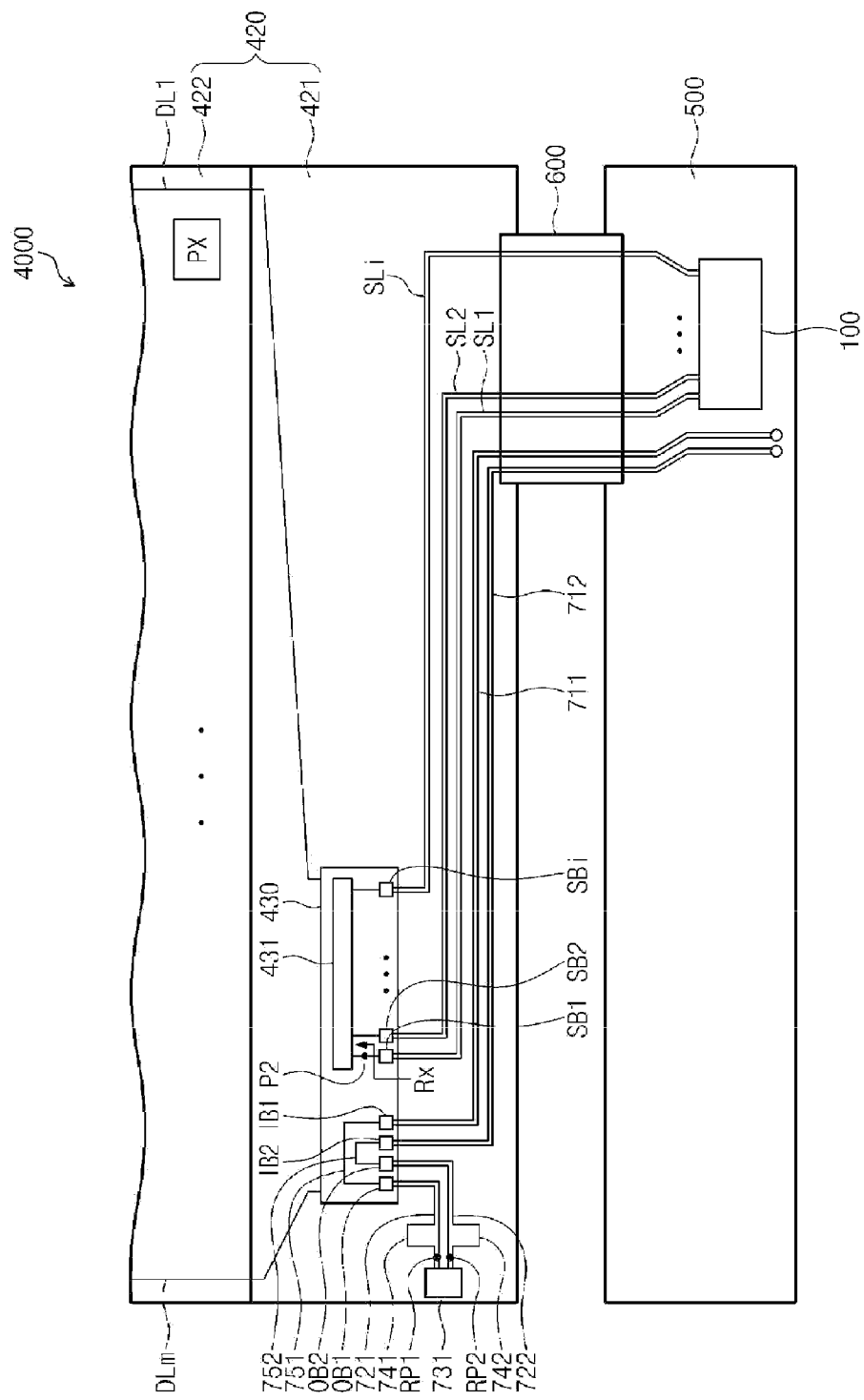
FIG. 7 is a partially enlarged plan view showing a portion of a display apparatus according to another exemplary embodiment of the present invention.

FIG. 7 is a partially enlarged plan view showing a portion of a display apparatus according to another exemplary embodiment of the present disclosure.

Referring to FIG. 7, a display apparatus 4000 includes first and second input lines 711 and 712, first and second output lines 721 and 722, and a test resistor 731. The display apparatus 4000 shown in FIG. 7 has the same structure and function as those of the display apparatus 1000 shown in FIGS. 2 to 4, except for the first and second input lines 711 and 712, the first and second output lines 721 and 722, and the test resistor 731.

In the present exemplary embodiment, the data control signal DCS may be transferred by a low voltage differential signal (LVDS) system that transfers data using an LVDS signal. The LVDS transmission system transfers the data control signal DCS at a high speed. In this case, the signal lines SL1 to SLi are grouped into a plurality of signal line groups, each being configured to include two signal lines, to transfer the data control signal DCS by the LVDS transmission system. For instance, first and second signal lines SL1 and SL2 are grouped into a pair, and transfer the data control signal DCS in LVDS form and the image signals RGB'.

The first and second input lines 711 and 712 extend on the pad part 421, the flexible printed circuit board 600, and the printed circuit board 500. One end of each of the first and second input lines 711 and 712 is electrically connected to the driver chip 430, and the other end of each of the first and second input lines 711 and 712 are disposed on the printed circuit board 100. The first and second input lines 711 and 712 extend substantially parallel to the signal lines SL1 to SLi without crossing the signal lines SL1 to SLi. The first and second input lines 711 and 712 are spaced apart from each other and extend substantially parallel to each other.

The first and second output lines 721 and 722 are disposed on the pad part 421 without crossing the signal lines SL1 to SLi and the first and second input lines 711 and 712. One ends of the first and second output lines 721 and 722 are electrically connected to the driver chip 430 and the other ends of the first and second output lines 721 and 722 are electrically connected to the test resistor 731.

The driver chip 430 includes first and second bumps IB1 and IB2, and first and second output bumps OB1 and OB2.

The first and second input bumps IB1 and IB2 are disposed on the one ends of the first and second input lines 711 and 712, respectively. An anisotropic conductive film (not shown) is disposed between the first and second input bumps IB1 and IB2 and the first and second input lines 711 and 712. The first and second input bumps IB1 and IB2 are electrically connected to the one ends of the first and second input lines 711 and 712 by the anisotropic conductive film, respectively.

The first and second output bumps OB1 and OB2 are disposed on the one ends of the first and second output lines 721 and 722, respectively. An anisotropic conductive film (not shown) is disposed between the first and second output bumps OB1 and OB2 and the first and second output lines 721 and 722. The first and second output bumps OB1 and OB2 are respectively electrically connected to the first and second output lines 721 and 722 by the anisotropic conductive film.

The first and second input bumps IB1 and IB2 are electrically connected to the first and second output bumps OB1 and OB2. As an example, the driver chip 430 may further include first and second shorting lines 751 and 752. One end of each of the first and second short lines 751 and 752 is electrically connected to the first and second input bumps IB1 and IB2, respectively, and the other end of each of the first and second short lines 751 and 752 is electrically connected to the first and second output bumps OB1 and OB2, respectively.

The test resistor 731 has substantially the same resistance value as the termination resistance of the driving IC 431. In the present exemplary embodiment, the termination resistance indicates a termination resistance of the pair of the signal lines. For instance, the termination resistance corresponds to the input resistance obtained by looking at the first and second signal lines SL1 and SL2.

The first and second input lines 711 and 712 have substantially the same impedance as that of the signal lines SL1 to SLi. Each of the first and second input lines 711 and 712 has a first width and a first thickness. The first width and the first thickness may be adjusted to allow the impedance of the first and second input lines 711 and 712 to be equal to that of the signal lines SL1 to SLi. As an example, the first thickness may be substantially the same as the second thickness of the signal lines SL1 to SLi, and the first width may be substantially the same as the second width of the signal lines SL1 to SLi.

In addition, a distance between the first and second input lines 711 and 712 is equal to a distance between two adjacent signal lines among the signal lines SL1 to SLi in order to evaluate any effects resulting from interference between the signal lines SL1 to SLi.

The first and second output lines 721 and 722 have substantially the same impedance as that of the signal lines SL1 to SLi. The first and second output lines 721 and 722 have a third width and a third thickness. The third width and the third thickness may be adjusted to allow the impedance of the first and second output lines 721 and 722 to be equal to that of the signal lines SL1 to SLi. As an example, the third thickness is substantially the same as the second thickness of the signal lines SL1 to SLi, and the third width is substantially the same as the second width of the signal lines SL1 to SLi.

Further, a distance between the first and second output lines 721 and 722 is equal to a distance between two adjacent signal lines among the signal lines SL1 to SLi in order to evaluate any effects caused by interference between the signal lines SL1 to SLi.

The data control signal DCS is applied to the driving IC 431 after sequentially passing through the signal lines SL1 to SLi and the signal bumps SB1 to SBi. In this case, the data control signal DCS is distorted by the signal lines SL1 to SLi and the signal bumps SB1 to SBi before being applied to the IC input terminal P2 of the driving IC 431. The distorted data control signal DCS is measured at the IC input terminal P2, and the transmission characteristics of the data control signal DCS are evaluated.

Hereinafter, a node to which the test resistor 731 and the first output line 721 are connected is referred to as a "first resistor input terminal RP1", and a node to which the test resistor 731 and the second output line 722 are connected is referred to as a "second resistor input terminal RP2".

When a first test signal is applied to the other end of the first input line 711, the first test signal is applied to the first resistor input terminal RP1 after sequentially passing through the first input line 711, the first input bump IB1, the first short line 751, the first output bump OB1, and the first output line 721.

When a second test signal is applied to the other end of the second input line 712, the second test signal is applied to the second resistor input terminal RP2 after sequentially passing through the second input line 712, the second input bump IB2, the second short line 752, the second output bump OB2, and the second output line 722.

Then, the distorted first and second test signals are measured at the first and second resistor input terminals RP1 and RP2, and thus, the transmission characteristic of the first and second test signals are evaluated.

As an example, the first and second test signals may be the LVDS.

Accordingly, the transmission characteristic of the data control signal DCS input to the driving IC 431 and transferred by the LVDS transmission system may be accurately evaluated by measuring the first and second test signals at the first and second resistor input terminals P1 and P2, and evaluating the transmission characteristic of the first and second test signals. Therefore, it is unnecessary to directly measure the IC input terminal P2 of the driving IC.

In the present exemplary embodiment, the display apparatus 4000 may further include first and second test pads 741 and 742 electrically connected to the first and second output lines 721 and 722, respectively. Each of the first and second test pads 741 and 742 may have a rectangular shape and a width greater than that of the first and second output lines 721 and 722. Each of the first and second test pads 741 and 742 may be formed by elongating an end of the first and second output lines 721 and 722.

Because the first and second test pads 741 and 742 have a width greater than that of the first and second output lines 721 and 722, the first and second test signal may be more easily measured through the first and second test pads 741 and 742.

According to the exemplary embodiments described above, the display apparatus includes the test resistor having the resistor input terminal equivalent to the input terminal of the driving IC for testing purposes. Therefore, the transmission characteristic of the test signal at the resistance input terminal corresponds to the transmission characteristic of the data control signal at the input terminal of the driving IC and the image data. Thus, the transmission characteristic of the data control signal input to the driving IC may be easily and accurately evaluated by evaluating the transmission characteristic of the test signal at the resistor input terminal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a display panel comprising pixels;
a driver chip disposed on the display panel and configured to drive the display panel, the driver chip comprising a driving IC, signal bumps, an input bump, and an output bump electrically connected to the input bump in the driver chip;
a printed circuit board comprising a timing controller;
a flexible printed circuit board configured to electrically connect the display panel and the printed circuit board;
a signal lines that each having one end electrically connected to one of the signal bumps and the other end electrically connected to the timing controller;
an input line configured to apply a test signal to the input bump of the driver chip;
an output line having a first end electrically connected to the output bump of the driver chip; and
a test resistor connected to a second end of the output line.

2. The display apparatus of claim 1, wherein the test resistor has a resistance value that is equal to a termination resistance of the driving IC.

3. The display apparatus of claim 2, wherein the input line has the same impedance as the signal lines.

4. The display apparatus of claim 3, wherein the input line has the same thickness as and a same width as the signal lines.

5. The display apparatus of claim 2, wherein the output line has the same impedance as the signal lines.

6. The display apparatus of claim 5, wherein the output line has the same thickness and the same width as the signal lines.

7. The display apparatus of claim 1, further comprising a test pad electrically connected to the output line, the test pad having a width greater than that of the output line.

8. The display apparatus of claim 7, wherein the test pad and the test resistor are disposed on the display panel.

9. The display apparatus of claim 8, wherein the display panel comprises:
a display area comprising the pixels; and
a non-display area disposed outside of the display area, wherein the test pad and the test resistor are disposed in the non-display area.

10. The display apparatus of claim 7, wherein the test pad and the test resistor are disposed on the printed circuit board.

11. The display apparatus of claim 10, wherein the test resistor comprises a variable resistor.

12. The display apparatus of claim 1, wherein one end of the input line is connected to the timing controller.

13. The display apparatus of claim 12, wherein the timing controller comprises a test signal input part configured to input the test signal to the input line.

14. The display apparatus of claim 1, wherein:
the display panel comprises an array substrate and an opposite substrate facing the array substrate; and
the driver chip is mounted on the array substrate.

15. The display apparatus of claim 1, wherein the driver chip comprises a shorting line configured to short-circuit the input bump and the output bump.

16. The display apparatus of claim 1, further comprising an anisotropic conductive film electrically connecting the signal bumps, the input bump, and the output bump to the signal lines, the input line, and the output line, respectively.

17. A display apparatus comprising:
a display panel comprising pixels;
a driver chip disposed on the display panel and configured to drive the display panel, the driver chip comprising a driving IC, signal bumps, first and second input bumps, and first and second output bumps electrically connected to the first and second input bumps in the driver chip, respectively;
a printed circuit board comprising a timing controller;
a flexible printed circuit board configured to electrically connect the display panel and the printed circuit board;
signal lines each having one end electrically connected to one of the signal bumps and the other end electrically connected to the timing controller;
first and second input lines configured to respectively apply first and second test signals to the first and second input bumps of the driver chip;
first and second output lines each having a first end electrically connected to the first and second output bumps of the driver chip, respectively; and
a test resistor connected between second ends of the first and second output lines.

18. The display apparatus of claim 17, wherein a distance between the first and second input lines is equal to a distance between the signal lines.

19. The display apparatus of claim 17, wherein a distance between the first and second output lines is equal to a distance between the signal lines.

20. The display apparatus of claim 17, wherein each of the first and second test signals is a low voltage differential signal.

* * * * *